United States Patent
Du et al.

(10) Patent No.: US 8,995,845 B2
(45) Date of Patent: Mar. 31, 2015

(54) MULTI-LASER TRANSMITTER OPTICAL SUBASSEMBLY FOR OPTOELECTRONIC MODULES

(75) Inventors: Tengda Du, Mountain View, CA (US); Bernd Huebner, Mountain View, CA (US)

(73) Assignee: Finisar Corporation, Sunnyvale, CA (US)

(*) Notice: Subject to any disclaimer, the term of this patent is extended or adjusted under 35 U.S.C. 154(b) by 159 days.

(21) Appl. No.: 13/346,254

(22) Filed: Jan. 9, 2012

(65) Prior Publication Data

US 2013/0177320 A1   Jul. 11, 2013

(51) Int. Cl.
 *H04B 10/04*   (2006.01)
 *G02B 6/42*    (2006.01)
 *H04B 10/40*   (2013.01)
 *H04B 10/50*   (2013.01)
 *G02B 6/293*   (2006.01)

(52) U.S. Cl.
 CPC ............ *H04B 10/40* (2013.01); *G02B 6/29362* (2013.01); *G02B 6/4215* (2013.01); *H04B 10/506* (2013.01)
 USPC ............... 398/201; 398/79; 398/91; 398/135; 398/182; 398/136; 398/158; 398/159; 398/82; 398/87; 385/24; 385/37

(58) Field of Classification Search
 USPC ......... 398/182, 183, 192, 193, 79, 82, 84, 85, 398/87, 158, 159, 152, 135, 136, 137, 138, 398/139, 164, 202, 208, 209, 200, 201, 91; 385/88, 89, 90, 92, 93, 24, 37
 See application file for complete search history.

(56) References Cited

U.S. PATENT DOCUMENTS

| | | | |
|---|---|---|---|
| 6,563,976 B1 | 5/2003 | Grann et al. | |
| 6,870,976 B2 * | 3/2005 | Chen et al. | 385/14 |
| 6,954,592 B2 | 10/2005 | Tan et al. | |
| 7,184,621 B1 * | 2/2007 | Zhu | 385/24 |
| 7,583,900 B2 * | 9/2009 | Dallesasse et al. | 398/135 |
| 7,668,422 B2 * | 2/2010 | Kropp | 385/47 |
| 8,488,244 B1 * | 7/2013 | Li et al. | 359/618 |
| 8,540,437 B2 * | 9/2013 | Lee et al. | 385/93 |
| 8,625,989 B2 * | 1/2014 | Du et al. | 398/65 |
| 2004/0101247 A1 | 5/2004 | Chen et al. | |
| 2004/0105161 A1 | 6/2004 | Tatum et al. | |
| 2008/0175591 A1 * | 7/2008 | Yu et al. | 398/65 |
| 2009/0103923 A1 * | 4/2009 | Hosomi et al. | 398/91 |
| 2010/0061730 A1 * | 3/2010 | Seki et al. | 398/79 |
| 2012/0189314 A1 * | 7/2012 | Xu et al. | 398/135 |
| 2012/0257902 A1 * | 10/2012 | Deng et al. | 398/152 |
| 2013/0195456 A1 * | 8/2013 | Sorin et al. | 398/65 |

OTHER PUBLICATIONS

International Search Report and Written Opinion mailed Apr. 26, 2013 in related PCT Application No. PCT/US2013/020878.

\* cited by examiner

*Primary Examiner* — Hanh Phan
(74) *Attorney, Agent, or Firm* — Maschoff Brennan

(57) ABSTRACT

A multi-laser transmitter optical subassembly may include N number of lasers, where each laser is configured to generate an optical signal with a unique wavelength. The transmitter optical subassembly may further include a focusing lens and a filter assembly. The filter assembly may combine the optical signals into a combined signal that is received by the focusing lens. The filter assembly may include N-1 number of filters. Each of the filters may pass at least one of the optical signals and reflect at least one of the optical signals. The filters may be low pass filters, high pass filters, or a combination thereof.

29 Claims, 15 Drawing Sheets

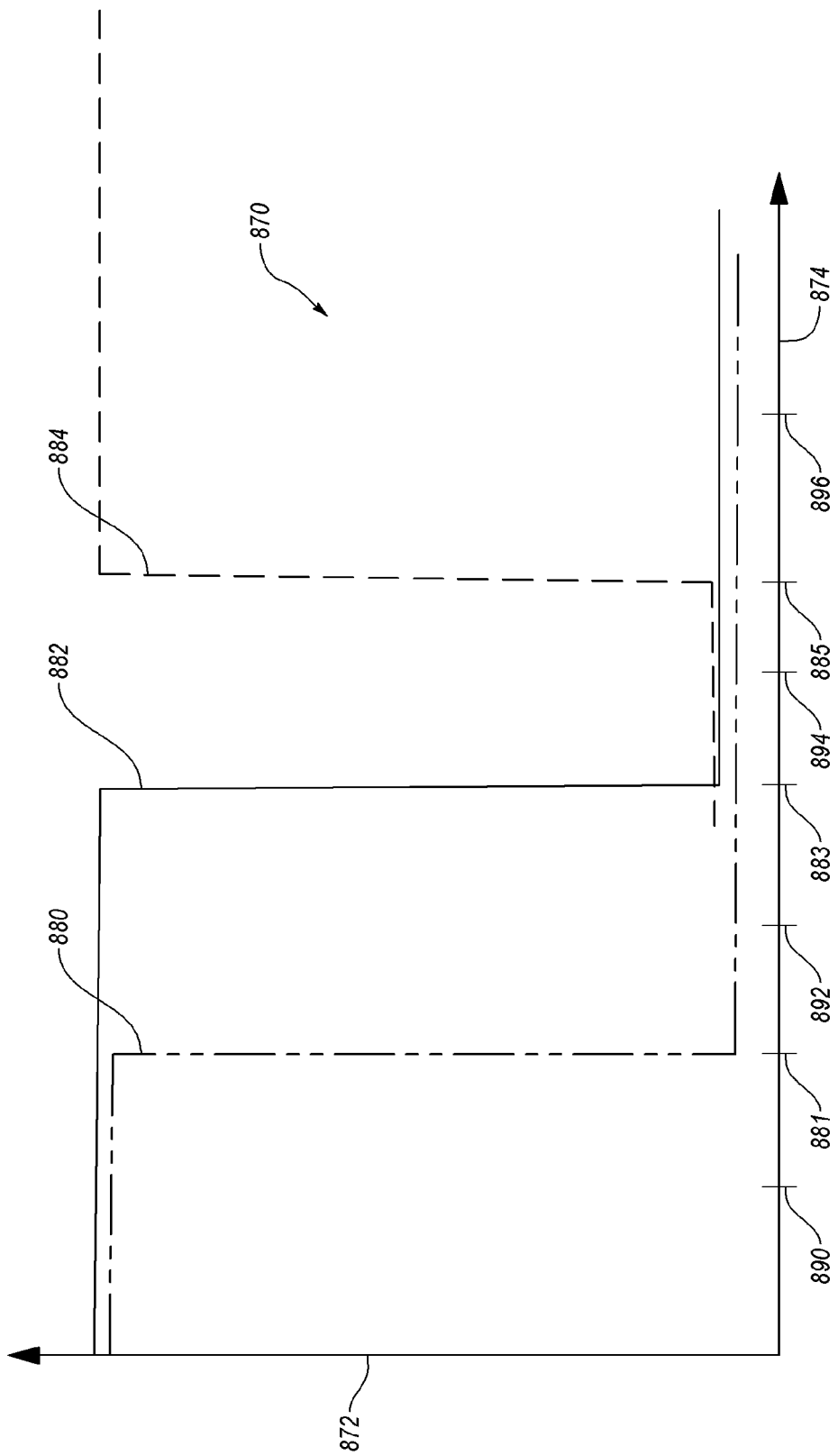

MULTI-LASER TRANSMITTER OPTICAL SUBASSEMBLY FOR OPTOELECTRONIC MODULES

BACKGROUND OF THE INVENTION

1. The Field of the Invention

Embodiments of the present invention relate to optoelectronic modules and in particular to multi-source transmitters in optoelectronic modules.

2. The Relevant Technology

Optoelectronic modules, such as optoelectronic transceiver or transponder modules, are increasingly used in electronic and optoelectronic communication. The modules may be designed specifically for certain applications or modularly for compatibility with a variety of host networking equipment. Modular modules typically follow multi-source agreements, such as the C Form-factor Pluggable and the Quad Small Form-factor Pluggable multi-source agreements that specify housing dimensions for modules, among other things. Conformity with a multi-source agreement allows a module to be plugged into host equipment designed in compliance with the multi-source agreement.

Modules typically communicate with a printed circuit board of a host device by transmitting electrical signals to the printed circuit board and receiving electrical signals from the printed circuit board. The received electrical signals may be transmitted by the module out of the host device as optical signals.

Optical signals may be generated within a transmitter optical subassembly (TOSA) of a module using a laser, such as a vertical cavity surface emitting laser, distributed feedback laser, or another type of laser. As data rates in modules increase, two or more lasers are often included in a single TOSA to handle the increase. However, as multi-source agreements specify increasingly smaller module housing dimensions, there is less available space for multi-laser TOSAs within module housings. In addition, multi-laser TOSAs are often relatively expensive and often suffer from relatively high optical loss.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY

In general, example embodiments relate to multi-laser transmitter optical subassemblies (TOSAs) for optoelectronic modules. At least some example multi-laser TOSAs disclosed herein exhibit a relatively low size, cost, and optical loss, thus enabling relatively improved overall performance of the optoelectronic modules into which the TOSAs are integrated.

In some embodiments, a TOSA may include two lasers, each laser configured to generate an optical signal with a unique wavelength. The TOSA may further include a focusing lens and a filter assembly that combines the optical signals into a combined optical signal that is received by the focusing lens. The filter assembly may include a filter that passes one optical signal and reflects another optical signal based on the wavelengths of the optical signals. The filter may be a low pass filter or a high pass filter and have a cutoff wavelength between the wavelengths of the optical signals. In some embodiments, the TOSA may further include an isolator between the filter and the focusing lens and collimating lenses between the lasers and the filter assembly.

In some embodiments, the TOSA may include three lasers, each laser configured to generate an optical signal with a unique wavelength. The TOSA may further include a focusing lens and a filter assembly. The filter assembly may combine the optical signals into a combined optical signal that is received by the focusing lens. The filter assembly may include two filters, each filter passing at least one of the optical signals and reflecting at least one of the optical signals.

In some embodiments, the TOSA may include N number of lasers, each laser configured to generate an optical signal with a unique wavelength. The TOSA may further include a focusing lens and a filter assembly. The filter assembly may combine the optical signals into a combined optical signal that is received by the focusing lens. The filter assembly may include N−1 number of filters. Each of the N−1 filters passes at least one of the N optical signals and reflects at least one of the N optical signals. The N−1 filters may be low pass filters, high pass filters, or a combination thereof.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description that follows or may be learned by the practice of the invention. These features and advantages may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 8B is a graph illustrating how a filter assembly of the TOSA of FIG. 8A interacts with optical signals according to some embodiments.

DETAILED DESCRIPTION OF EXAMPLE EMBODIMENTS

Figure 1:
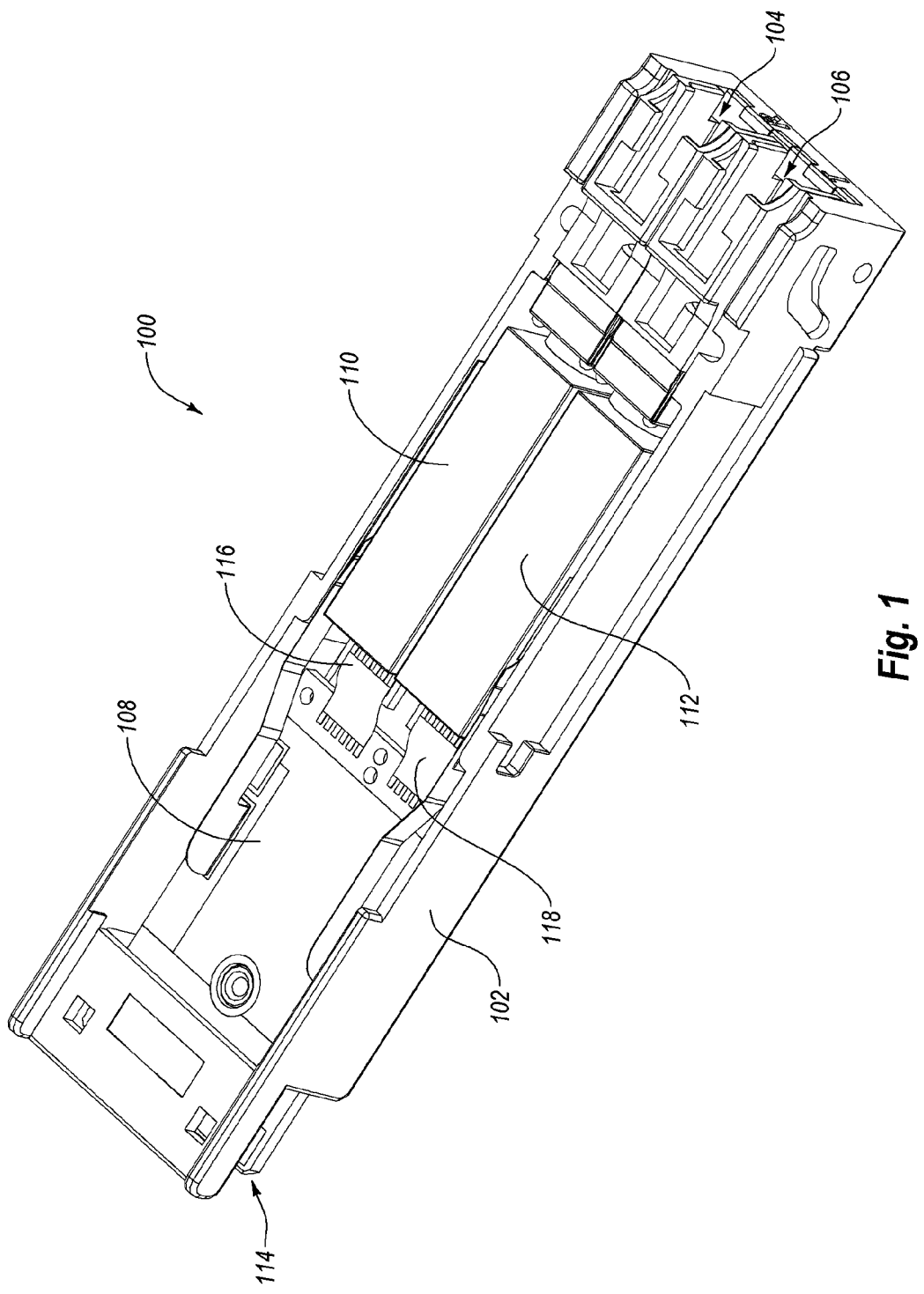
FIG. 1 is a perspective view of an optoelectronic module and associated transmitter optical subassembly (TOSA) according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With a need for increased data rates through optical communication channels, optoelectronic modules are employing multi-laser TOSAs. Multi-laser TOSAs contain multiple lasers, with each laser producing an optical carrier signal. The optical carrier signals from the multiply lasers may be multiplexed within the TOSAs and transmitted through a single optical fiber.

As technology advances, optoelectronic modules decrease in size requiring a reduction in size for the module's TOSA as well. Furthermore, as data rates increase, power loss of the optical carrier signals needs to be reduced. Accordingly, at least some example multi-laser TOSAs disclosed herein exhibit a relatively low size, cost, and optical loss, thereby enabling relatively improved overall performance of the optoelectronic modules into which the TOSAs are integrated.

In some embodiments, the TOSA may include at least two lasers, each laser configured to generate an optical signal with a unique wavelength. The TOSA may further include a focusing lens and a filter assembly that combines the optical signals into a combined optical signal that is received by the focusing lens. The filter assembly may include a filter that passes one optical signal and reflects another second optical signal based on the wavelengths of the optical signals. The filter may be a low pass filter or a high pass filter, each filter having a cutoff wavelength between the wavelengths of the optical signals. In some embodiments, the TOSA may further include an isolator between the filter and the focusing lens and collimating lenses between the lasers and the filter assembly.

Some embodiments of TOSAs may form part of an optoelectronic module. FIG. 1 illustrates a perspective view of an optoelectronic module 100 for use in transmitting and receiving optical signals in connection with a host device (not shown) according to some embodiments. As illustrated, the module 100 includes various components, including a bottom housing 102; a receive port 104 and a transmit port 106, both defined in the bottom housing 102; a printed circuit board (PCB) 108 positioned within the bottom housing 102; and a receiver optical subassembly (ROSA) 110 and a TOSA 112 also positioned within the bottom housing 102. An edge connector 114 is located on an end of the PCB 108 to enable the module 100 to electrically interface with the host device. As such, the PCB 108 facilitates electrical communication between the host device and the ROSA 110 and TOSA 112.

The module 100 may be configured for optical signal transmission and reception at a variety of data rates including, but not limited to, 40 Gb/s, 100 Gb/s, or higher. Furthermore, the module 100 may be configured for optical signal transmission and reception at various distinct wavelengths using wavelength division multiplexing (WDM). In WDM, multiple optical signals having distinct wavelengths are multiplexed onto a single optical fiber. For example, the module 100 may be configured to operate using one of various WDM schemes, such as Coarse WDM, Dense WDM, or Light WDM. Furthermore, the module 100 may be configured to support various communication protocols including, but not limited to, Fibre Channel and High Speed Ethernet. In addition, the module 100 may be configured in a variety of different form factors including, but not limited to, the C Form-factor Pluggable and the Quad Small Form-factor Pluggable multi-source agreements.

With continued reference to FIG. 1, the ROSA 110 may house one or more optical receivers, such as photodiodes, that are electrically coupled to an electrical interface 116. The TOSA 112 may houses one or more optical transmitters, such as lasers, that are electrically coupled to another electrical interface 118. The one or more optical receivers are configured to convert optical signals received through the receive port 104 into corresponding electrical signals that are relayed to the PCB 108 through the electrical interface 116. The one or more optical transmitters are configured to convert electrical signals received through the PCB 108 by way of the electrical interface 118 into corresponding optical signals that are transmitted through the transmit port 106. Accordingly, the ROSA 110 may serve as an optical-electronic transducer and the TOSA 112 may serve as an electronic-optical transducer. The optical ports 104, 106 may be configured to optically connect the optical receiver and the optical transceiver, respectively, with optical fibers and corresponding optical fiber connectors such as LC or SC connectors (not shown) that are connected to the optical ports 104, 106.

The module 100 illustrated with respect to FIG. 1 is one architecture in which embodiments of the present disclosure may be employed. It should be understood that this specific architecture is only one of countless architectures in which embodiments may be employed. The scope of the present disclosure is not intended to be limited to any particular architecture or environment.

Figure 2A:
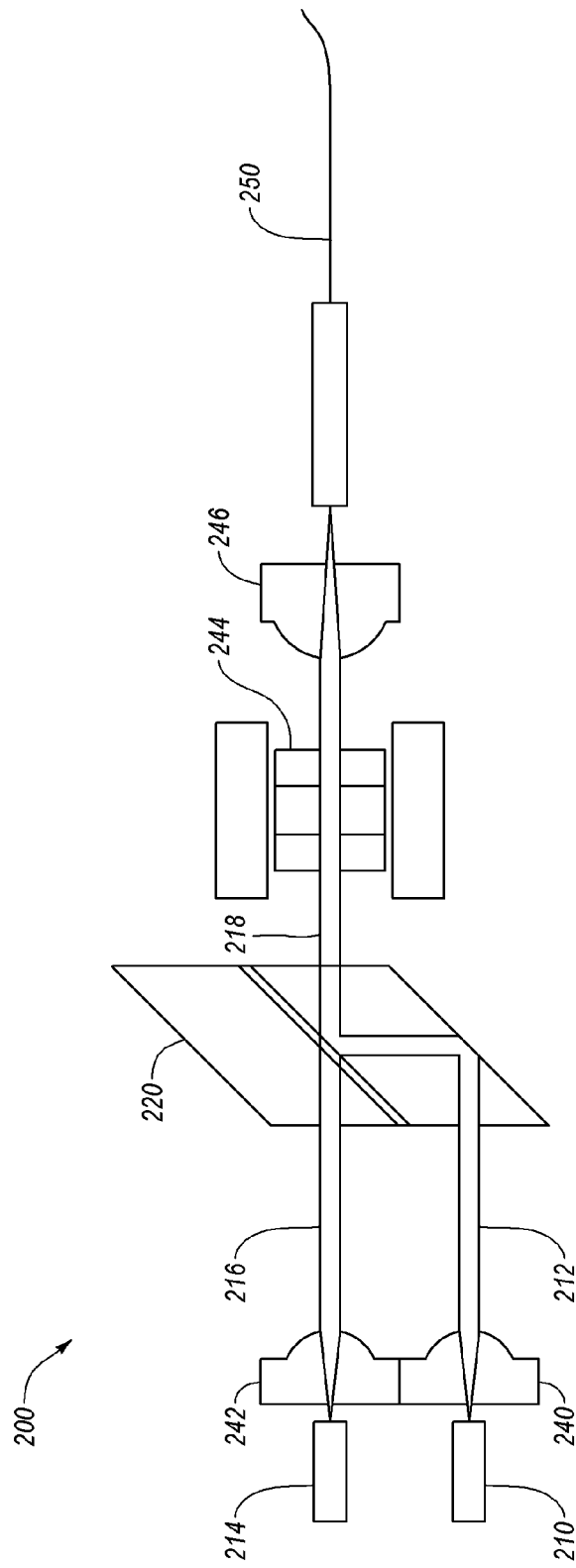
FIG. 2A is a schematic view of a TOSA according to some embodiments.

FIG. 2A illustrates a schematic view of a multi-laser TOSA 200 according to some embodiments. The TOSA 200 may be employed in a WDM environment in order to increase the data throughput on a single optical fiber 250.

The TOSA 200 includes first and second lasers 210, 214 configured to generate first and second optical signals 212, 216, respectively. The first and second lasers 210, 214 may be distributed feedback lasers, vertical cavity surface emitting lasers, external cavity diode lasers, quantum well lasers, quantum cascade lasers, or other types of laser. The first and second lasers 210, 214 may be the same type of lasers or different types of lasers. In some embodiments, the generated first and second optical signals 212, 216 may have different wavelengths and the same polarization. The polarization of the first and second optical signals 212, 216 may be linear or circular.

The TOSA 200 further includes a filter assembly 220 and a focusing lens 246. The filter assembly 220 receives and combines the first and second optical signals 212, 216 into a combined optical signal 218. The combined optical signal 218 is received by the focusing lens 246 directed into the optical fiber 250.

In some embodiments, the TOSA 200 may further include first and second collimating lenses 240, 242 positioned between the first and second lasers 210, 214, respectively, and the filter assembly 220. The TOSA 200 may also include an isolator 244 positioned between the filter assembly 220 and the focusing lens 246 to reduce or prevent back reflection from reaching either of the lasers 210, 214.

Figure 2B:
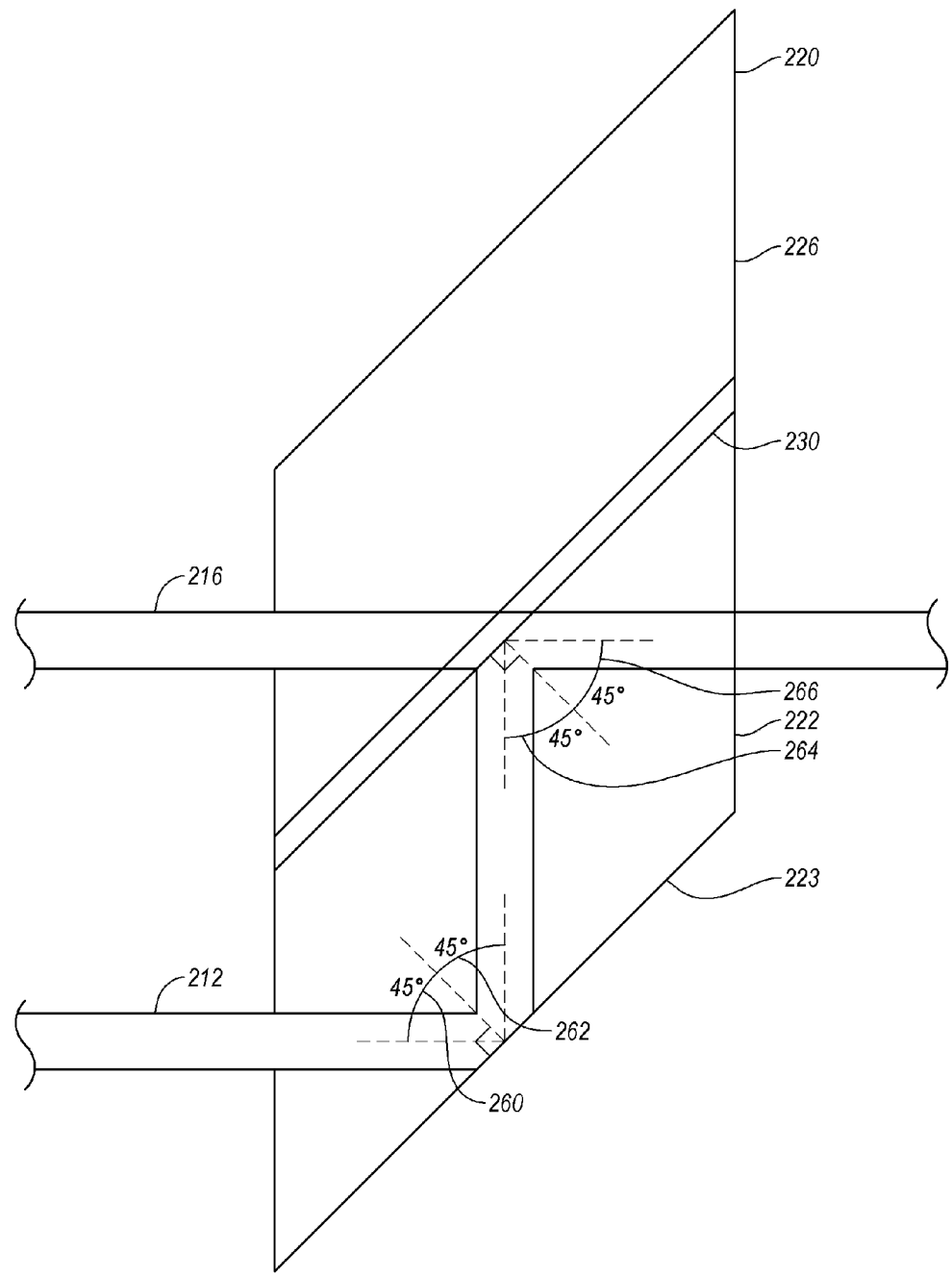
FIG. 2B is a schematic view of a filter assembly according to some embodiments.

FIG. 2B illustrates the filter assembly's 220 interactions with the first and second optical signals 212, 216 according to some embodiments. The filter assembly 220 includes first and second substrates 222, 226 with a filter 230 positioned between the substrates 222, 226. The first substrate 222 has a first edge 223 opposite the filter 230. The first and second substrates 222, 226 may be formed from any material that allows the transmission of the first and second optical signals 222, 226. For example, the first and second substrates 222, 226 may be formed of silicon dioxide, polymers, fluoride glasses, aluminosilicates, phosphate glasses, chalcogenide glasses, or other material. The first and second substrates 222, 226 may be formed of the same material, different materials, or any combination of materials.

The first substrate 222 is positioned to receive the first optical signal 212. The first optical signal 212 enters the first substrate 222 and strikes the first edge 223 with an angle of incidence 260 equal to approximately 45 degrees. Upon striking the first edge 223, the first optical signal 212 is reflected with an angle of reflection 262 equal to the angle of incidence 260, which is approximately 45 degrees. As a result, the first optical signal 212 is redirected toward the filter 230.

After being reflected, the first optical signal 212 passes through the first substrate 222 and strikes the filter 230 with an angle of incidence 264 equal to approximately 45 degrees. In this embodiment, the filter 230 may be a low pass filter with a cutoff wavelength between the wavelengths of the first and second optical signals 212, 216. The wavelength of the first optical signal 212 is above the cutoff wavelength of the filter 230. Accordingly, the filter 230 reflects the first optical signal 212 with an angle of reflection 266 equal to the angle of incidence 264, which is approximately 45 degrees. As a result, the first optical signal 212 is redirected toward the focusing lens 246 as illustrated in FIG. 2A.

The second substrate 226 is positioned to receive the second optical signal 216. The second optical signal 216 enters the second substrate 226 and strikes the filter 230. The wavelength of the second optical signal 216 is below the cutoff wavelength of the filter 230. Accordingly, the filter 230 does not alter the direction of the second optical signal 216 and passes the second optical signal 216 into the path of the first optical signal 212, thereby combining the optical signals 212, 216. The combination occurs because the optical signals 212, 216 are aligned with the filter assembly 220 so that the first optical signal 212 strikes and is reflected at a location on the filter 230 through which the second optical cable 216 also passes. It should be understood that the spacing between the first and second optical signals 212, 216 and the size of the filter assembly 220 may varying, but that the filter assembly 220 will have the proper dimensions based on the spacing between the optical signals 212, 216 to combine the optical signals 212, 216 as described herein.

Figure 2C:
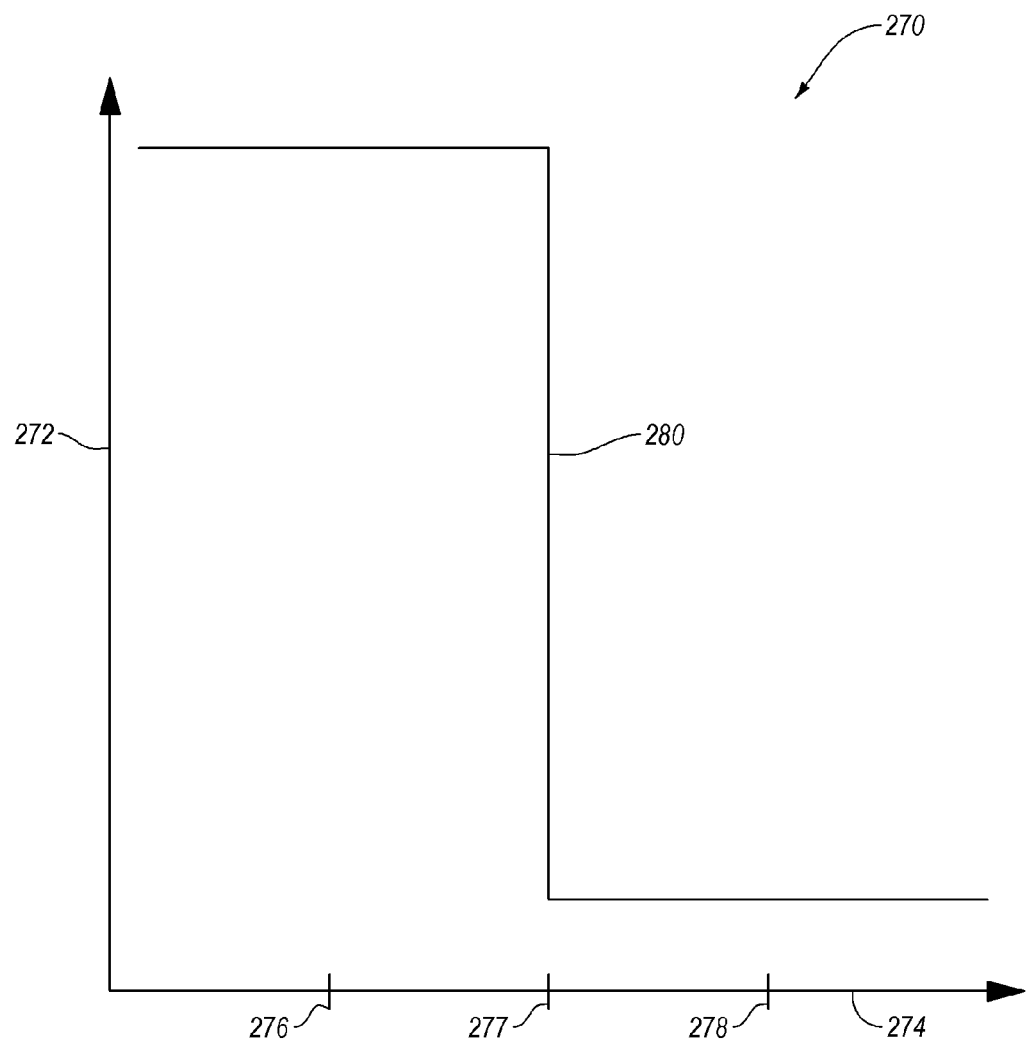
FIG. 2C is a graph illustrating how a filter assembly of the TOSA of FIG. 2A interacts with optical signals according to some embodiments.

FIG. 2C is a graph 270 illustrating a response of the low pass filter 230. The graph 270 has a first axis 272 that indicates the ability of the filter 230 to pass an optical signal. Thus, a higher value on the first axis 272 indicates that the filter 230 passes optical signals and a lower value on the first axis 272 indicates that the filter 230 reflects optical signals. The graph 270 further includes a second axis 274 that indicates the wavelength of optical signals. The step function 280 illustrates how the filter 230 responds to optical signals with varying wavelengths. As discussed above, the filter 230 has a cutoff wavelength 277. The filter 230 passes optical signals with wavelengths shorter than the cutoff wavelength 277 and reflects optical signals with wavelengths longer than the cutoff wavelength 277. The first optical signal 212 has a wavelength 278 that is longer than the cutoff wavelength 277. Accordingly, the first optical signal 212 is reflected by the filter 230. The second optical signal 216 has a wavelength 276 that is shorter than the cutoff wavelength 277. Accordingly, the second optical signal 216 is passed by the filter 230. Note that the cutoff wavelength 277 of the filter 230 may be adjusted according to the wavelengths of the optical signals 212, 216. The cutoff wavelength 277 of the filter 230 may be any wavelength as long as the cutoff wavelength 277 is between the wavelengths of the optical signals 212, 216 to allow the filter 230 to reflect the first optical signal 212 and pass the second optical signal 216.

Figure 3:
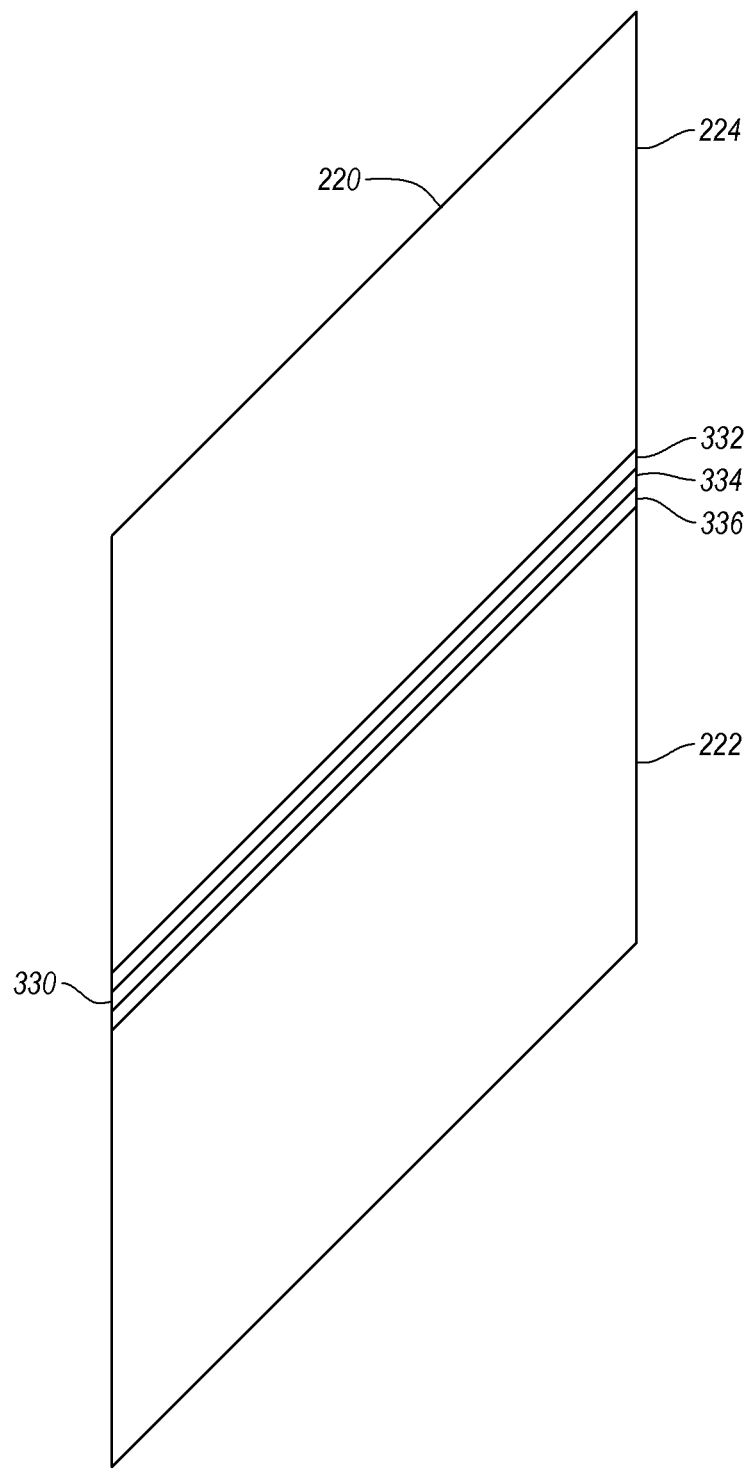
FIG. 3 is a filter assembly according to some embodiments.

FIG. 3 illustrates a filter 330 according to some embodiments. The filter 330 may include first, second, and third materials 332, 334, 336. The materials may be any type of material that may be used to produce a filter that reflects or passes optical signals. For example, the materials may include zinc sulfide, titanium dioxide, magnesium fluoride, silicon dioxide, or some other material. In some embodiments, the materials 332, 334, 336 may be the same or different. In some embodiments, the first material 332 may have a higher index of refraction than the second material 334. Additionally or alternatively, the second material 334 may have a lower index of refraction than the third material 336. The types of material as well as the thickness of the material may be varied to produce different cutoff wavelengths for the filter 330. Furthermore, in some embodiments, the filter 330 may be produced by more or less than three materials. Note that may different constructions of filters may be used without varying from the scope of the present disclosure.

Figure 4A:
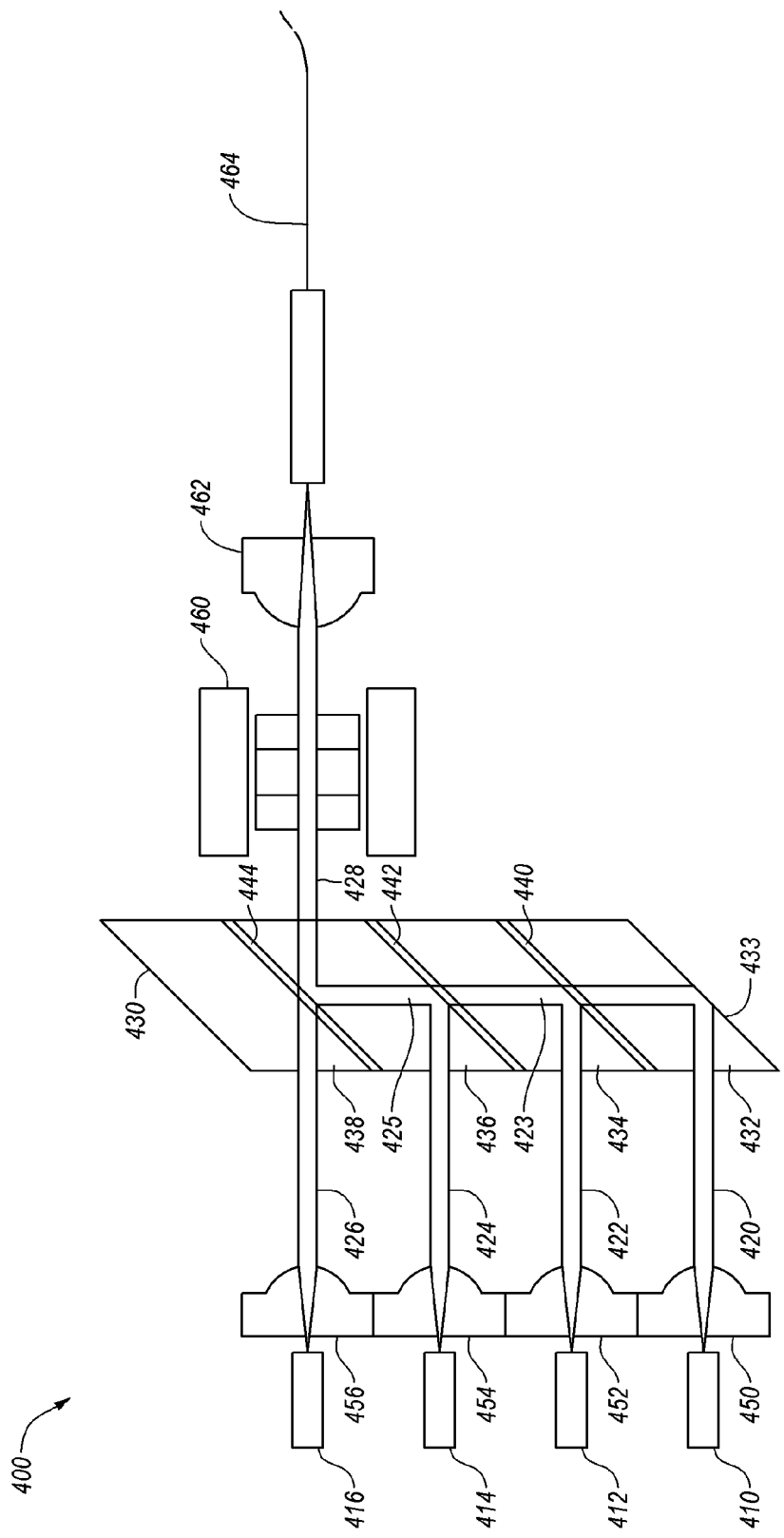
FIG. 4A is a schematic view of a TOSA according to some embodiments.

FIG. 4A illustrates a schematic view of a multi-laser TOSA 400 according to some embodiments. The TOSA 400 may be employed in a WDM environment in order to increase the data throughput on a single optical fiber 464.

The TOSA 400 includes first, second, third, and fourth lasers 410, 412, 414, 416 configured to generate first, second, third, and fourth optical signals 420, 422, 424, 426, respectively. The first, second, third, and fourth lasers 410, 412, 414, 416 may be distributed feedback lasers, vertical cavity surface emitting lasers, external cavity diode lasers, quantum well lasers, quantum cascade lasers, or other types of lasers. The first, second, third, and fourth lasers 410, 412, 414, 416 may be the same type of lasers, different types of lasers, or any combination of several types of lasers. In some embodiments, the generated first, second, third, and fourth optical signals 420, 422, 424, 426 may have different wavelengths and the same polarization. The polarization of the first, second, third, and fourth optical signals 420, 422, 424, 426 may be linear, circular, or a combination thereof.

The TOSA 400 further includes a filter assembly 430 and a focusing lens 462. The filter assembly 430 receives and combines the first, second, third, and fourth optical signals 420, 422, 424, 426 into a combined optical signal 428. The filter assembly 430 also passes the combined optical signal 428 through the focusing lens 462 and into the optical fiber 464.

The filter assembly 430 includes first, second, third, and fourth substrates 432, 434, 436, 438 and first, second, and third filters 440, 442, 444. The first filter 440 resides between the first and second substrates 432, 434. The first substrate 440 has a first edge 433 opposite the first filter 440. The second filter 442 resides between the second and third substrates 434, 436. The third filter 444 resides between the third and fourth substrates 436, 438.

The first, second, third, and fourth substrates 432, 434, 436, 438 may be formed from any material that allows the transmission of the first, second, third, and fourth optical signals 420, 422, 424, 426. For example, the first, second, third, and fourth substrates 432, 434, 436, 438 may be formed of silicon dioxide, polymers, fluoride glasses, aluminosilicates, phosphate glasses, chalcogenide glasses, or other materials. The first, second, third, and fourth substrates 432, 434, 436, 438 may be formed of the same material, different materials, or any combination of materials.

The first substrate 432 is positioned to receive the first optical signal 420. The first optical signal 420 enters the first substrate 432, strikes the first edge 433, and is reflected toward the first filter 440. After being reflected, the first optical signal 420 passes through the first substrate 432 and strikes the first filter 440. In this embodiment, the first filter 440 is a low pass filter with a cutoff wavelength between the wavelengths of the first and second optical signals 420, 422. The wavelength of the first optical signal 420 is below the cutoff wavelength of the first filter 440. Accordingly, the first filter 440 passes the first optical signal 420 into the second substrate 434.

The second substrate 434 is positioned to receive the second optical signal 422. The second optical signal 422 enters the second substrate 434 and strikes the first filter 440. The wavelength of the second optical signal 422 is above the cutoff wavelength of the first filter 440. Accordingly, the first filter 440 reflects the second optical signal 422 into the path of the first optical signal 420 thereby combining the first and second optical signals 420, 422 into a combined first and second optical signal 423.

The combined first and second optical signal 423 is passed toward the second filter 442. In this embodiment, the second filter 442 is a low pass filter with a cutoff wavelength that is longer than the wavelengths of the first and second optical signals 420, 422 and shorter than the wavelength of the third optical signal 424. Accordingly, the second filter 442 passes the combined first and second optical signal 423 into the third substrate 436.

The third substrate 436 is positioned to receive the third optical signal 424. The third optical signal 424 enters the third substrate 436 and strikes the second filter 442. As noted, the wavelength of the third optical signal 424 is above the cutoff wavelength of the second filter 442. Accordingly, the second filter 442 reflects the third optical signal 424 into the path of the combined first and second optical signal 420, 422 thereby combining the first, second, and third optical signals 420, 422, 424 into a combined first, second, and third optical signal 425.

The combined first, second, and third optical signal 425 is passed toward the third filter 444. In this embodiment, the third filter 444 is a low pass filter with a cutoff wavelength that is shorter than the wavelengths of the first, second, and third optical signals 420, 422, 424 and longer than the wavelength of the fourth optical signal 426. Accordingly, the third filter 444 reflects the combined first, second, and third optical signal 425 toward the focusing lens 462.

The fourth substrate 438 is positioned to receive the fourth optical signal 426. The fourth optical signal 426 enters the fourth substrate 438 and strikes the third filter 444. As noted, the wavelength of the fourth optical signal 426 is below the cutoff wavelength of the third filter 444. Accordingly, the third filter 444 passes the fourth optical signal 426 into the path of the combined first, second, and third optical signal 425 thereby combining the first, second, third, and fourth optical signals 420, 422, 424, 426 into the combined optical signal 428 that is received by the focusing lens 462.

In some embodiments, the TOSA 400 may further include first, second, third, and fourth collimating lenses 450, 452, 454, 456 positioned between the first, second, third, and fourth lasers 410, 412, 414, 416, respectively, and the filter assembly 430. The TOSA 400 may also include an isolator 460 positioned between the filter assembly 430 and the focusing lens 462 to reduce or prevent back reflection from reaching any of the lasers 410, 412, 414, 416.

Figure 4B:
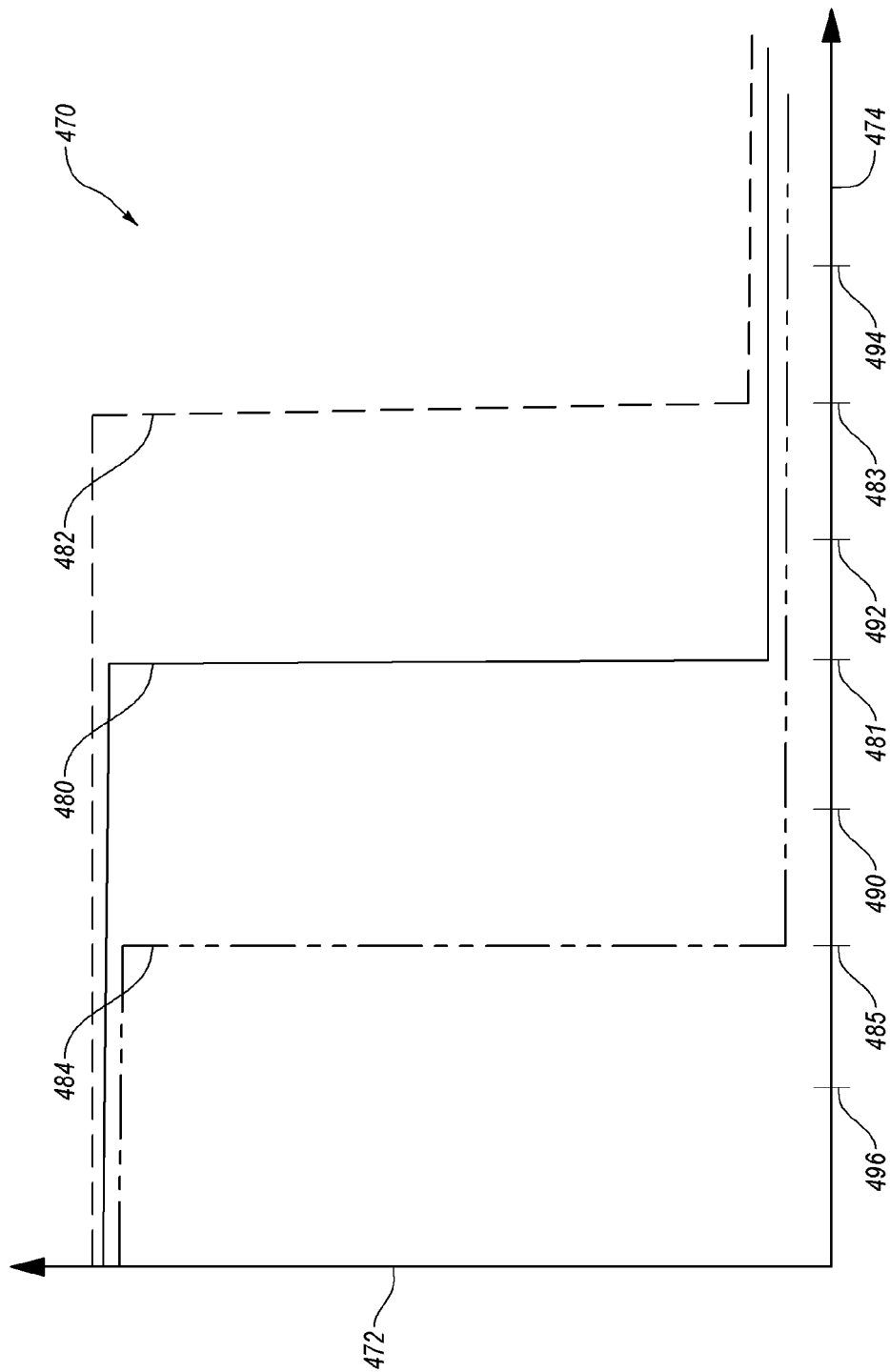
FIG. 4B is a graph illustrating how a filter assembly of the TOSA of FIG. 4A interacts with optical signals according to some embodiments.

FIG. 4B is a graph 470 illustrating optical signals interactions with the first, second, and third low pass filters 440, 442, 444 in the filter assembly 430. The graph 470 has a first axis 472 that indicates the ability of the filters 440, 442, 444 to pass an optical signal. The graph 470 further includes a second axis 474 that indicates the wavelength of optical signals. The step function 480 illustrates how the first low pass filter 440 with a cutoff wavelength 481 responds to optical signals with varying wavelengths. The step function 482 illustrates how the second low pass filter 442 with a cutoff wavelength 483 responds to optical signals with varying wavelengths. The step function 484 illustrates how the third low pass filter 444 with a cutoff wavelength 485 responds to optical signals with varying wavelengths.

FIG. 4B further illustrates the wavelengths of the first, second, third, and fourth optical signals 420, 422, 424, 426. The first optical signal 420 has a wavelength 490 between the cutoff wavelength 485 and the cutoff wavelength 481. The second optical signal 422 has a wavelength 492 between the cutoff wavelength 483 and the cutoff wavelength 481. The third optical signal 424 has a wavelength 494 greater than the cutoff wavelength 483. The fourth optical signal 426 has a wavelength 496 less than the cutoff wavelength 485. It should be understood that the cutoff wavelengths 481, 483, 485, of the first, second, and third filters 440, 442, 444, respectively, may be adjusted according to the wavelengths of the optical signals 420, 422, 424, 426 as long as the wavelengths of the optical signals 420, 422, 424, 426 maintain their relative locations between the cutoff wavelengths 481, 483, 485 of the first, second, and third filters 440, 442, 444, respectively.

Figure 5A:
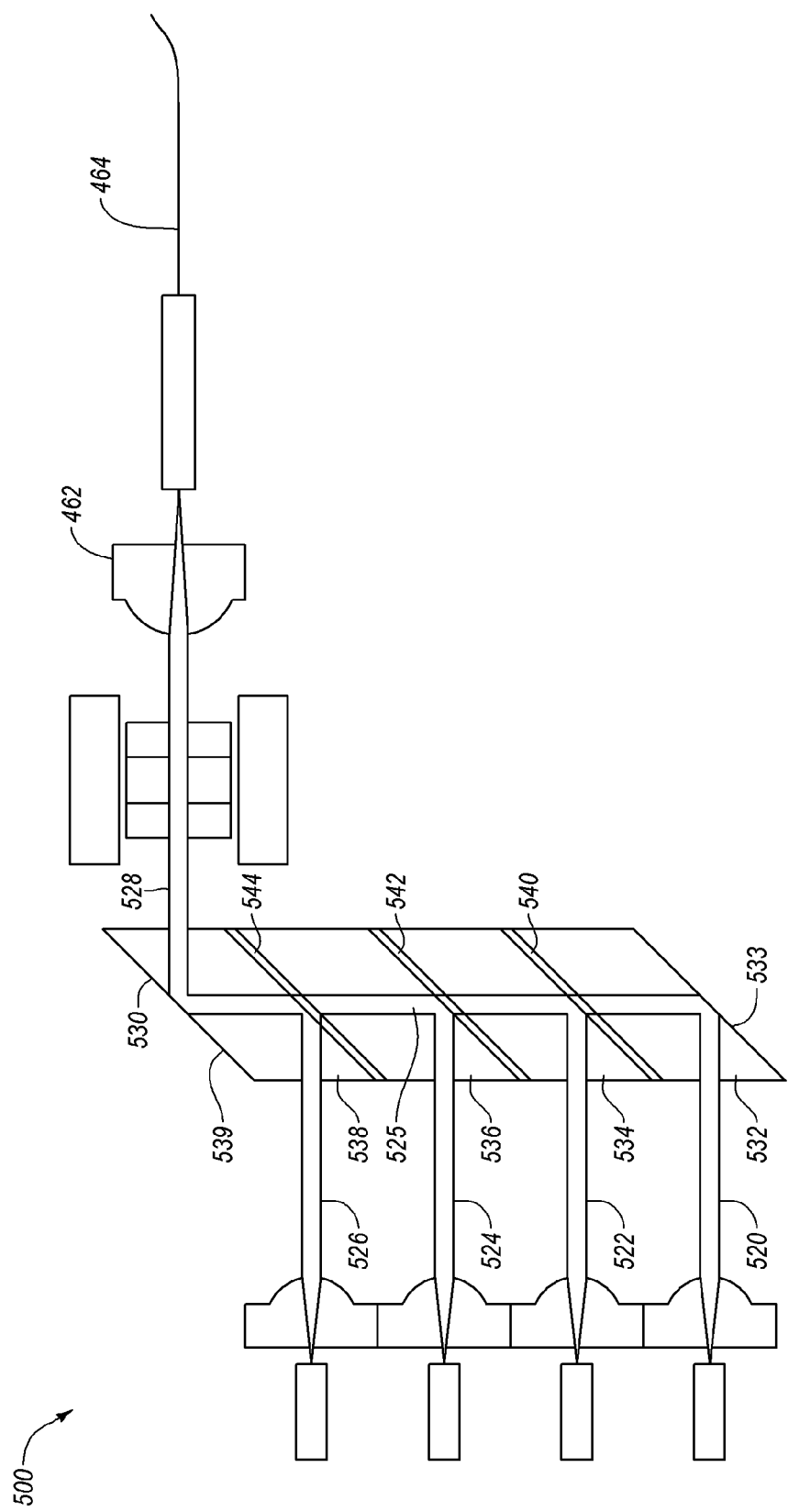
FIG. 5A is a schematic view of a TOSA according to some embodiments.

FIG. 5A illustrates a schematic view of a multi-laser TOSA 500 according to some embodiments. The TOSA 500 may be employed in a WDM environment in order to increase the data throughput on a single optical fiber 464.

The TOSA 500 is similar to the TOSA 400 except that the filter assembly 430 is replaced with a filter assembly 530 that combines the optical signals in a different manner and the wavelengths of the first, second, third, and fourth optical signals 520, 522, 524, 526 in the TOSA 500 may vary from the wavelengths of the first, second, third, and fourth optical signals 420, 422, 424, 426 in the TOSA 400.

In the TOSA 500, first and second filters 540, 542 combine the first, second, and third optical signals 520, 522, 524 in a manner similar to how the first and second filters 440, 442 combine the first, second, and third optical signals 420, 422, 424 in the TOSA 400. Accordingly, a combined first, second, and third optical signal 525 is passed toward a third filter 544. In this embodiment, the third filter 544 is a low pass filter with a cutoff wavelength that is longer than the wavelengths of the first, second, and third optical signals 520, 522, 524 and shorter than the wavelength of the fourth optical signal 526. Accordingly, the third filter 544 passes the combined first, second, and third optical signal 525 into a fourth substrate 538 toward a side 539 of the fourth substrate 538 that is opposite the third filter 544.

The fourth substrate 538 is positioned to receive the fourth optical signal 526. The fourth optical signal 526 enters the fourth substrate 538 and strikes the third filter 544. As noted, the wavelength of the fourth optical signal 526 is above the cutoff wavelength of the third filter 544. Accordingly, the third filter 544 reflects the fourth optical signal 526 into the path of the combined first, second, and third optical signal 525 thereby combining the first, second, third, and fourth optical signals 520, 522, 524, 526 into a combined optical signal 528. The combined optical signal 528 travels through the fourth substrate 538, strikes the side 539, and reflects toward the focusing lens 462.

Figure 5B:
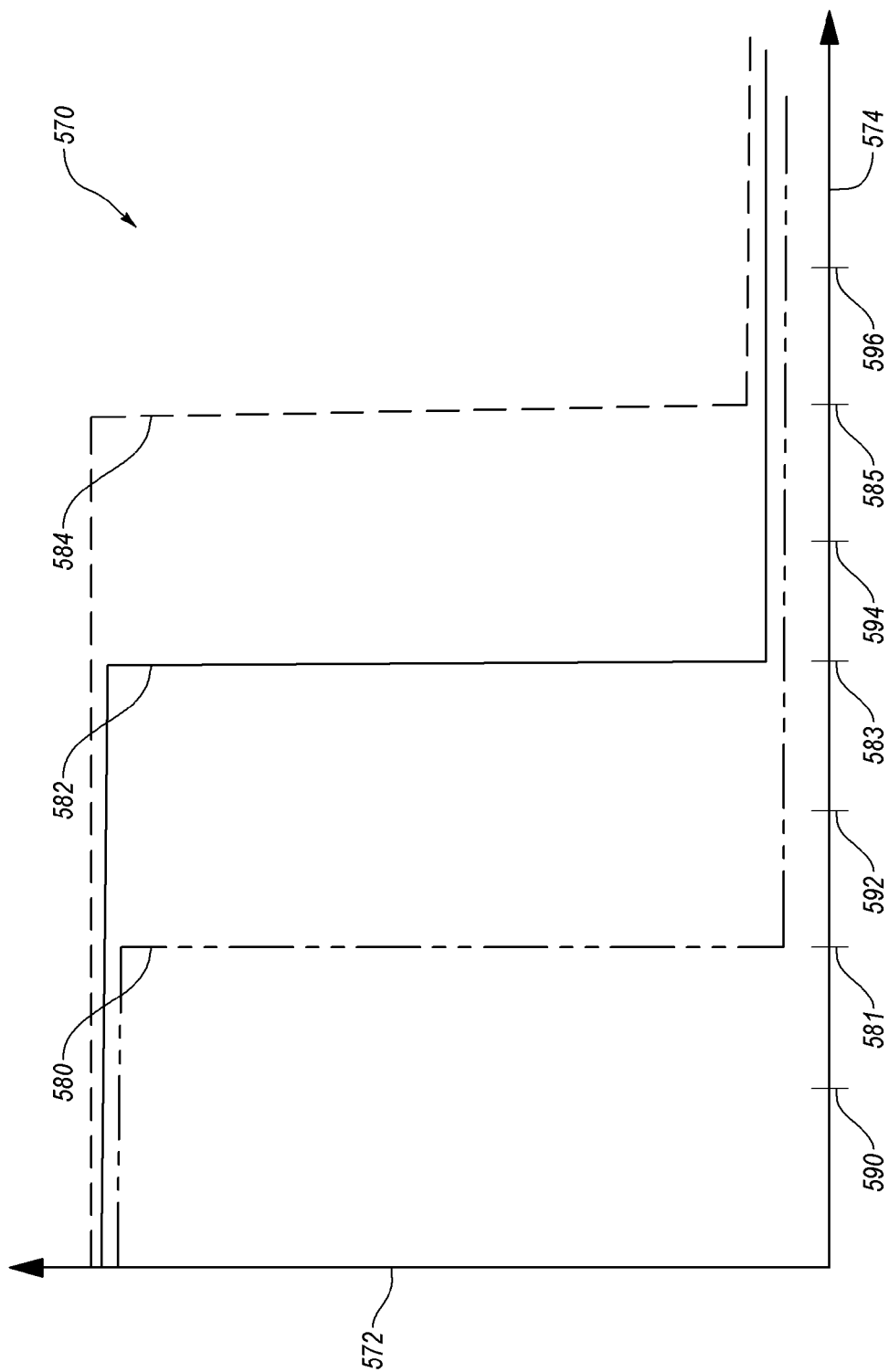
FIG. 5B is a graph illustrating how a filter assembly of the TOSA of FIG. 5A interacts with optical signals according to some embodiments.

FIG. 5B is a graph 570 illustrating optical signals interactions with the first, second, and third low pass filters 540, 542, 544 in the filter assembly 530. The graph 570 has a first axis 572 that indicates the ability of the filter 530 to pass an optical signal. The graph 570 further includes a second axis 574 that indicates the wavelength of optical signals. The step function 580 illustrates how the first low pass filter 540 with a cutoff wavelength 581 responds to optical signals with varying wavelengths. The step function 582 illustrates how the second low pass filter 542 with a cutoff wavelength 583 responds to optical signals with varying wavelengths. The step function 584 illustrates how the third low pass filter 544 with a cutoff wavelength 585 responds to optical signals with varying wavelengths.

FIG. 5B further illustrates the wavelengths of the first, second, third, and fourth optical signals 520, 522, 524, 526. The first optical signal 520 has a wavelength 590 below the cutoff wavelength 581. The second optical signal 522 has a wavelength 592 between the cutoff wavelength 581 and the cutoff wavelength 583. The third optical signal 524 has a wavelength 594 between the cutoff wavelength 583 and the cutoff wavelength 585. The fourth optical signal 526 has a wavelength 596 greater than the cutoff wavelength 585. It should be understood that the cutoff wavelengths 581, 583, 585, of the first, second, and third filters 540, 542, 544, respectively, may be adjusted according to the wavelengths of the optical signals 520, 522, 524, 526 as long as the wavelengths of the optical signals 520, 522, 524, 526 maintain their relative locations between the cutoff wavelengths 581, 583, 585 of the first, second, and third filters 540, 542, 544, respectively.

Figure 6A:
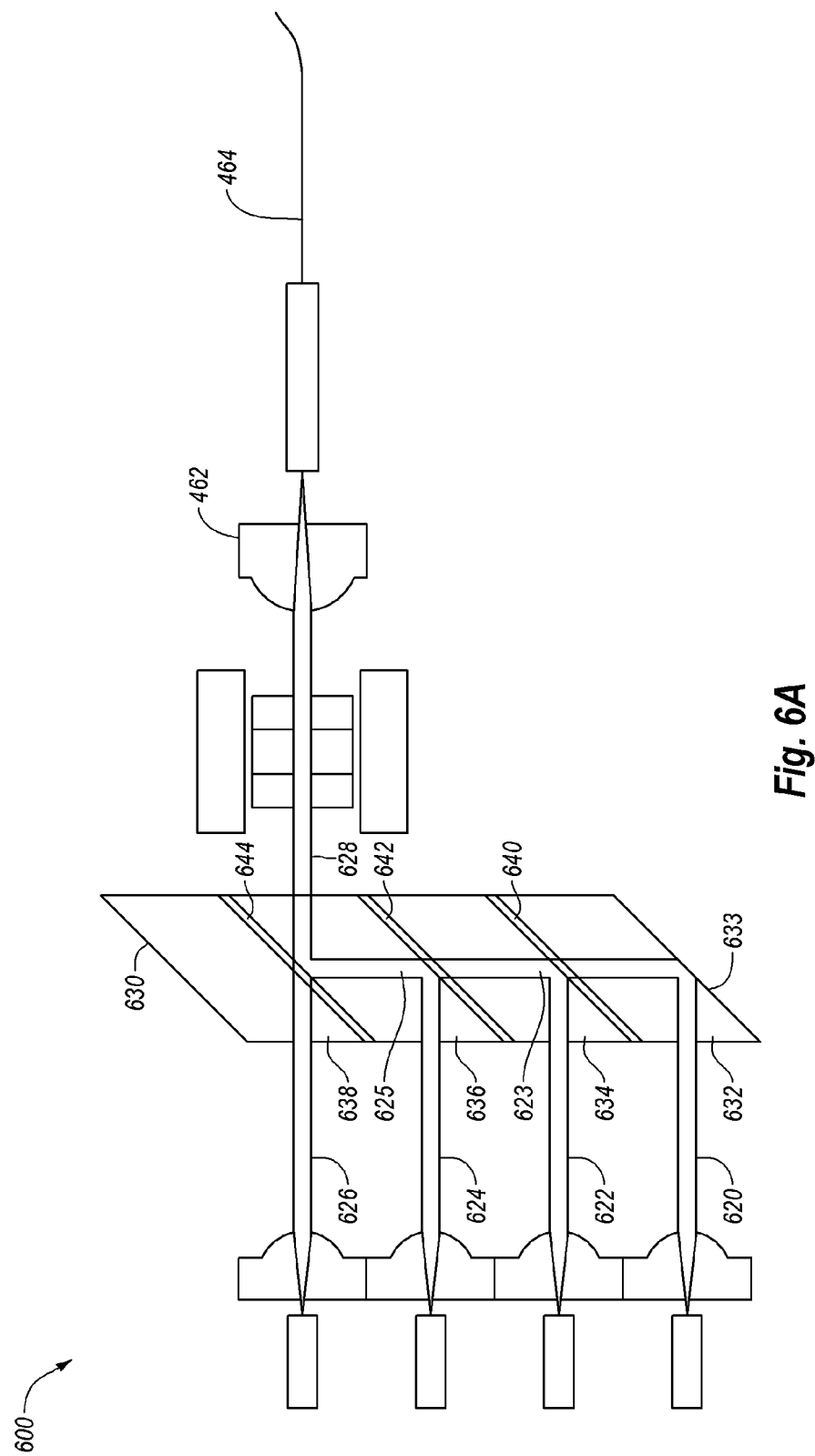
FIG. 6A is a schematic view of a TOSA according to some embodiments.

FIG. 6A illustrates a schematic view of a multi-laser TOSA 600 according to some embodiments. The TOSA 600 may be employed in a WDM environment in order to increase the data throughput on a single optical fiber 464.

The TOSA 600 is similar to the TOSA 400 except that the filter assembly 430 is replaced with a filter assembly 630 that combines the optical signals in a different manner and the wavelengths of the first, second, third, and fourth optical signals 620, 622, 624, 626 may vary from the wavelengths of the first, second, third, and fourth optical signals 420, 422, 424, 426.

In the TOSA 600, a first substrate 632 in the filter assembly 630 is positioned to receive the first optical signal 620. The first optical signal 620 enters the first substrate 632, strikes a first edge 633 of the first substrate 632, and is reflected toward the first filter 640. After being reflected, the first optical signal 620 travels through the first substrate 632 and strikes the first filter 640. In this embodiment, the first filter 640 is a high pass filter with a cutoff wavelength between the wavelengths of the first and second optical signals 620, 622. The wavelength of the first optical signal 620 is above the cutoff wavelength of the first filter 640. Accordingly, the first filter 640 passes the first optical signal 620 into a second substrate 634.

The second substrate 634 is positioned to receive the second optical signal 622. The second optical signal 622 enters the second substrate 634 and strikes the first filter 640. The wavelength of the second optical signal 622 is below the cutoff wavelength of the first filter 640. Accordingly, the first filter 640 reflects the second optical signal 622 into the path of the first optical signal 620 thereby combining the first and second optical signals 620, 622 into a combined first and second optical signal 623.

The combined first and second optical signal 623 is passed toward a second filter 642. In this embodiment, the second filter 642 is a high pass filter with a cutoff wavelength that is shorter than the wavelengths of the first and second optical signals 620, 622 and longer than the wavelength of the third optical signal 624. Accordingly, the second filter 642 passes the combined first and second optical signal 623 into a third substrate 636.

The third substrate 636 is positioned to receive the third optical signal 624. The third optical signal 624 enters the third substrate 636 and strikes the second filter 642. As noted, the wavelength of the third optical signal 624 is below the cutoff wavelength of the second filter 642. Accordingly, the second filter 642 reflects the third optical signal 624 into the path of the combined first and second optical signal 623 thereby combining the first, second, and third optical signals 620, 622, 624 into a combined first, second, and third optical signal 625.

The combined first, second, and third optical signal 625 is passed toward the third filter 644. In this embodiment, the third filter 644 is a high pass filter with a cutoff wavelength that is longer than the wavelengths of the first, second, and third optical signals 620, 622, 624 and shorter than the wavelength of the fourth optical signal 626. Accordingly, the third filter 644 reflects the combined first, second, third optical signal 625 toward the focusing lens 462.

The fourth substrate 638 is positioned to receive the fourth optical signal 626. The fourth optical signal 626 enters the fourth substrate 638 and strikes the third filter 644. As noted, the wavelength of the fourth optical signal 626 is above the cutoff wavelength of the third filter 644. Accordingly, the third filter 644 passes the fourth optical signal 626 into the path of the combined first, second, and third optical signal 620, 622, 624 thereby combining the first, second, third, and fourth optical signals 620, 622, 624, 626 into a combined optical signal 628 that received by the focusing lens 462.

Figure 6B:
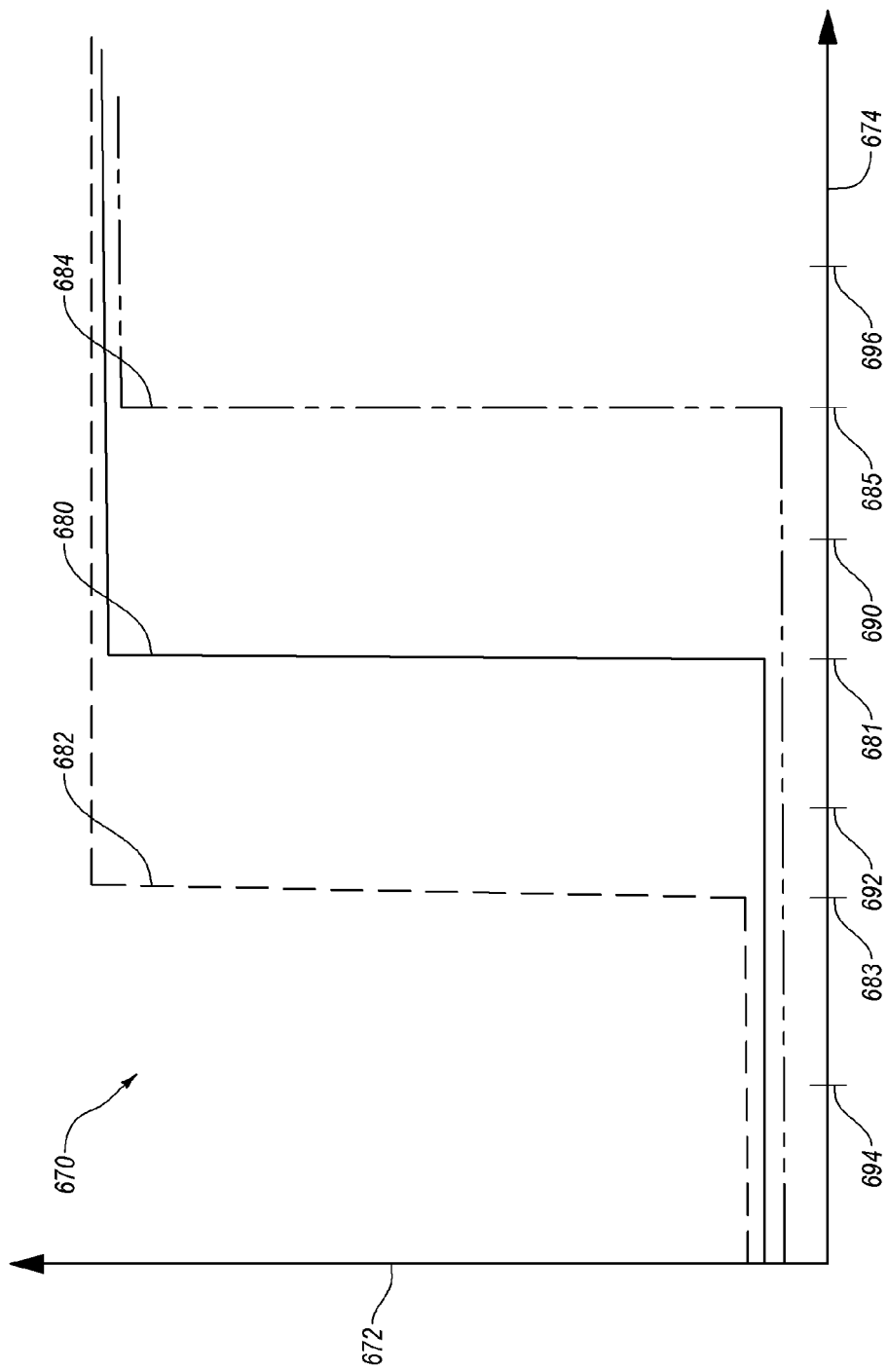
FIG. 6B is a graph illustrating how a filter assembly of the TOSA a FIG. 6A interacts with optical signals according to some embodiments.

FIG. 6B is a graph 670 illustrating optical signals interactions with the first, second, and third high pass filters 640, 642, 644 in the filter assembly 630. The graph 670 has a first axis 672 that indicates the ability of the high pass filters 640, 642, 644 to pass an optical signal. The graph 670 further includes a second axis 674 that indicates the wavelength of optical signals. The step function 682 illustrates how the first high pass filter 640 with a cutoff wavelength 683 responds to optical signals with varying wavelengths. The step function 684 illustrates how the second high pass filter 642 with a cutoff wavelength 685 responds to optical signals with varying wavelengths. The step function 684 illustrates how the third high pass filter 644 with a cutoff wavelength 685 responds to optical signals with varying wavelengths.

FIG. 6B further illustrates the wavelengths of the first, second, third, and fourth optical signals 620, 622, 624, 626. The first optical signal 620 has a wavelength 690 between the cutoff wavelength 681 and the cutoff wavelength 685. The second optical signal 622 has a wavelength 692 between the cutoff wavelength 683 and the cutoff wavelength 681. The third optical signal 624 has a wavelength 694 less than the cutoff wavelength 683. The fourth optical signal 626 has a wavelength 696 greater than the cutoff wavelength 685. It should be understood that the cutoff wavelengths 681, 683, 685, of the first, second, and third filters 640, 642, 644, respectively, may be adjusted according to the wavelengths of the optical signals 620, 622, 624, 626 as long as the wavelengths of the optical signals 620, 622, 624, 626 maintain their relative locations between the cutoff wavelengths 681, 683, 685 of the first, second, and third filters 640, 642, 644, respectively.

Figure 7A:
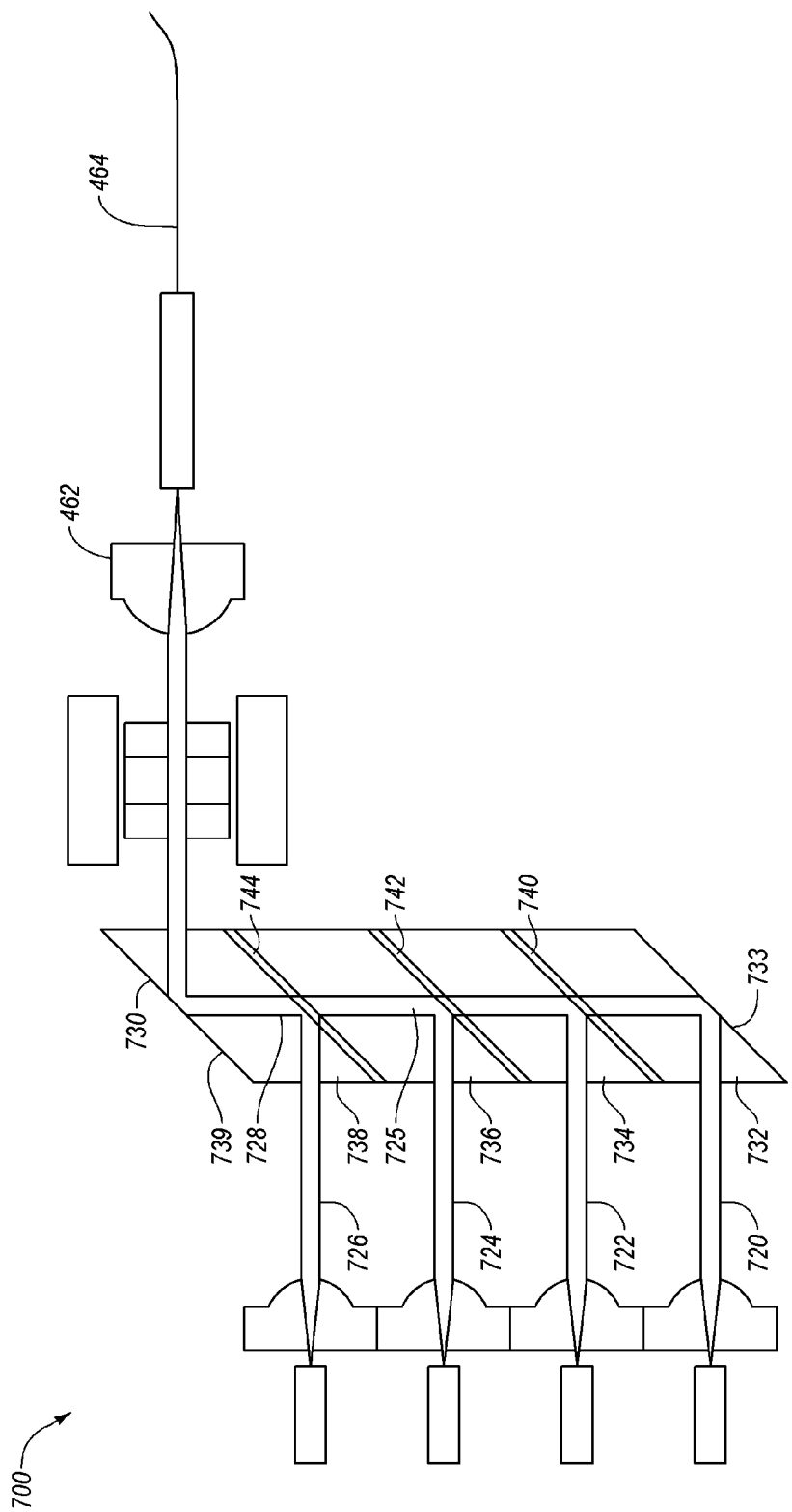
FIG. 7A is a schematic view of a TOSA according to some embodiments.

FIG. 7A illustrates a schematic view of a multi-laser TOSA 700 according to some embodiments. The TOSA 700 may be employed in a WDM environment in order to increase the data throughput on a single optical fiber 464.

The TOSA 700 is similar to the TOSA 600 except that the filter assembly 630 is replaced with a filter assembly 730 that combines the optical signals in a different manner and the wavelengths of the first, second, third, and fourth optical signals 720, 722, 724, 726 may vary from the wavelengths of the first, second, third, and fourth optical signals 620, 622, 624, 626.

In TOSA 700, first and second filters 740, 742 combine the first, second, and third optical signals 720, 722, 724 in a manner similar to how the first and second filters 640, 642 combine the first, second, and third optical signals 620, 622, 624 in the TOSA 600. Accordingly, a combined first, second, and third optical signal 725 is passed toward a third filter 744. In this embodiment, the third filter 744 is a high pass filter with a cutoff wavelength that is shorter than the wavelengths of the first, second, and third optical signals 720, 722, 724 and longer than the wavelength of the fourth optical signal 726. Accordingly, the third filter 744 passes the combined first, second, and third optical signal 725 into a fourth substrate 738 toward a side 739 of the fourth substrate 738 that is opposite the third filter 744.

The fourth substrate 738 is positioned to receive the fourth optical signal 726. The fourth optical signal 726 enters the fourth substrate 738 and strikes the third filter 744. As noted, the wavelength of the fourth optical signal 726 is below the cutoff wavelength of the third filter 744. Accordingly, the third filter 744 reflects the fourth optical signal 726 into the path of the combined first, second, and third optical signal 725 thereby combining the first, second, third, and fourth optical signals 720, 722, 724, 726 into a combined optical signal 728. The combined optical signal 728 travels through the fourth substrate 738, strikes the side 739, and reflects toward the focusing lens 462.

Figure 7B:
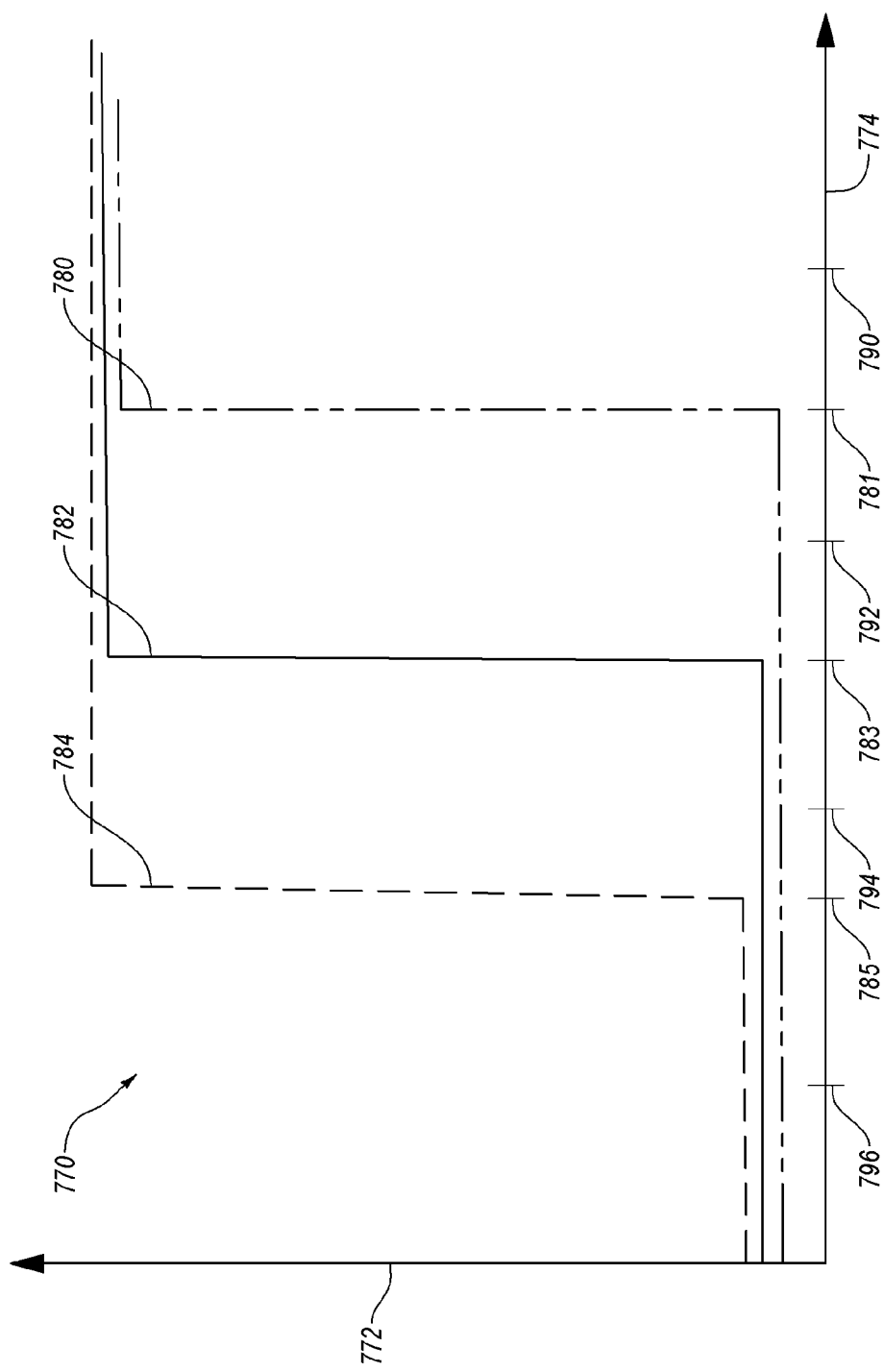
FIG. 7B is a graph illustrating how a filter assembly of the TOSA of FIG. 7A interacts with optical signals according to some embodiments.

FIG. 7B is a graph 770 illustrating optical signals interactions with the first, second, and third high pass filters 740, 742, 744 in the filter assembly 730. The graph 770 has a first axis 772 that indicates the ability of the high pass filters 740, 742, 744 to pass an optical signal. The graph 770 further includes a second axis 774 that indicates the wavelength of optical signals. The step function 780 illustrates how the first high pass filter 740 with a cutoff wavelength 781 responds to optical signals with varying wavelengths. The step function 782 illustrates how the second high pass filter 742 with a cutoff wavelength 783 responds to optical signals with varying wavelengths. The step function 784 illustrates how the third high pass filter 744 with a cutoff wavelength 785 responds to optical signals with varying wavelengths.

FIG. 7B further illustrates the wavelengths of the first, second, third, and fourth optical signals 720, 722, 724, 726. The first optical signal 720 has a wavelength 790 greater than the cutoff wavelength 781. The second optical signal 722 has a wavelength 792 between the cutoff wavelength 781 and the cutoff wavelength 783. The third optical signal 724 has a wavelength 794 between the cutoff wavelength 783 and the cutoff wavelength 785. The fourth optical signal 726 has a wavelength 796 less than the cutoff wavelength 785. It should be understood that the cutoff wavelengths 781, 783, 785, of the first, second, and third filters 740, 742, 744, respectively, may be adjusted according to the wavelengths of the optical signals 720, 722, 724, 726 as long as the wavelengths of the optical signals 720, 722, 724, 726 maintain their relative locations between the cutoff wavelengths 781, 783, 785 of the first, second, and third filters, 740, 742, 744, respectively.

Figure 8A:
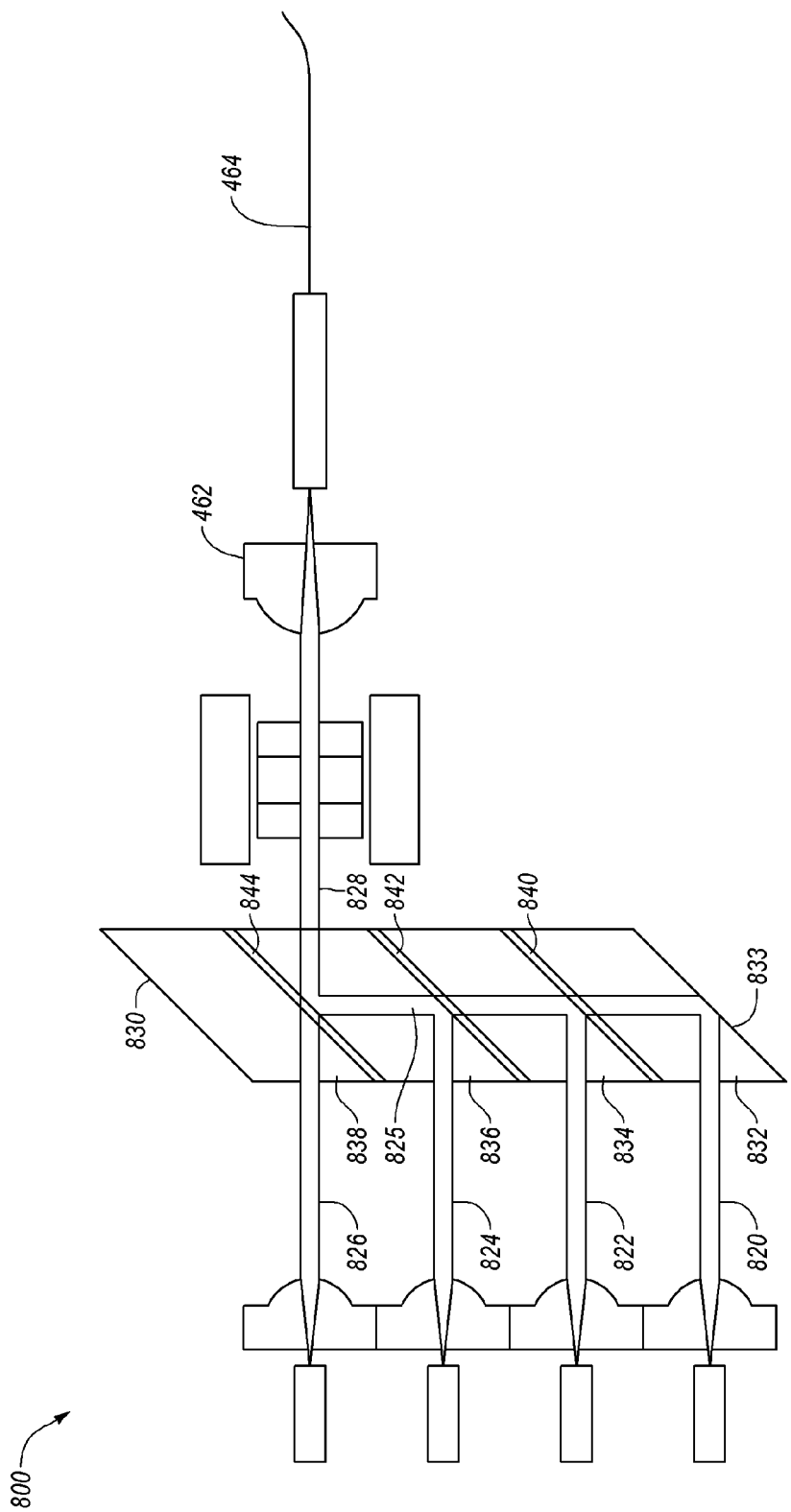
FIG. 8A is a schematic view of a TOSA according to some embodiments.

FIG. 8A illustrates a schematic view of a multi-laser TOSA 800 according to some embodiments. The TOSA 800 may be employed in a WDM environment in order to increase the data throughput on a single optical fiber 464.

The TOSA 800 is similar to the TOSA 400 except that the filter assembly 430 is replaced with a filter assembly 830 that combines the optical signals in a different manner and the wavelengths of the first, second, third, and fourth optical signals 820, 822, 824, 826 may vary from the wavelengths of the first, second, third, and fourth optical signals 420, 422, 424, 426.

In the TOSA 800, first and second low pass filters 840, 842 combine the first, second, and third optical signals 820, 822, 824 in a manner similar to how the first and second low pass filters 440, 442 combine the first, second, and third optical signals 420, 422, 424 in the TOSA 400. Accordingly, a combined first, second, and third optical signal 825 is passed toward a third filter 844. In this embodiment, the third filter 844 is a high pass filter with a cutoff wavelength that is longer than the wavelengths of the first, second, and third optical signals 820, 822, 824 and shorter than the wavelength of the fourth optical signal 826. Accordingly, the third filter 844 reflects the combined first, second, and third optical signal 825 towards the focusing lens 462.

The fourth substrate 838 is positioned to receive the fourth optical signal 826. The fourth optical signal 826 enters the fourth substrate 838 and strikes the third filter 844. As noted, the wavelength of the fourth optical signal 826 is above the cutoff wavelength of the high pass third filter 844. Accordingly, the third filter 844 passes the fourth optical signal 826 into the path of the combined first, second, and third optical signal 825 thereby combining the first, second, third, and fourth optical signals 820, 822, 824, 826 into a combined optical signal 828. The combined optical signal 828 travels through the third substrate 836 toward the focusing lens 462.

FIG. 8B is a graph 870 illustrating optical signals interactions with the first, second, and third filters 840, 842, 844 in the filter assembly 830. The graph 870 has a first axis 872 that indicates the ability of the filters 840, 842, 844 to pass an optical signal. The graph 870 further includes a second axis 874 that indicates the wavelength of optical signals. The step function 880 illustrates how the low pass first filter 840 with a cutoff wavelength 881 responds to optical signals with varying wavelengths. The step function 882 illustrates how the low pass second filter 842 with a cutoff wavelength 883 responds to optical signals with varying wavelengths. The step function 884 illustrates how the high pass third filter 844 with a cutoff wavelength 885 responds to optical signals with varying wavelengths.

FIG. 8B further illustrates the wavelengths of the first, second, third, and fourth optical signals 820, 822, 824, 826. The first optical signal 820 has a wavelength 890 below the cutoff wavelength 881. The second optical signal 822 has a wavelength 892 between the cutoff wavelength 881 and the cutoff wavelength 883. The third optical signal 824 has a wavelength 894 between the cutoff wavelength 883 and the cutoff wavelength 885. The fourth optical signal 826 has a wavelength 896 greater than the cutoff wavelength 885. It should be understood that the cutoff wavelengths 881, 883, 885, of the first, second, and third filters 840, 842, 844, respectively, may be adjusted according to the wavelengths of the optical signals 820, 822, 824, 826 as long as the wavelengths of the optical signals 820, 822, 824, 826 maintain their relative locations between the cutoff wavelengths 881, 883, 885 of the first, second, and third filters, 840, 842, 844, respectively.

FIGS. 2A, 4A, 5A, 6A, 7A, and 8A illustrate various embodiments of TOSA using various filter assemblies. It should be understood that a TOSA may include more than 2 or 4 lasers. For example, a TOSA may include N lasers that produce N optical signals with different wavelengths that are employed in a WDM environment in order to increase the data throughput on a single optical fiber. The N optical signals may be combined by a single filter assembly that includes N substrates and N−1 filters where each of the N substrates may be separated from another of the N substrates by one of the N−1 filters. The N−1 filters may be low pass filters, high pass filters, or a combination of low and high pass filters. In any event, the cutoff wavelengths of the each of the N−1 filters are different and each filter's cutoff wavelength is between the wavelengths of two of the N optical signals. Furthermore, each of the N−1 filters may pass at least one of the N optical signals and reflect at least one of the N optical signals.

In some embodiments, the TOSA with N lasers may further include a focusing lens that receives the combined optical signal from the filter assembly and directs the combined optical signal into an optical cable. The TOSA may further include N collimating lenses positioned between the N lasers and the filter assembly. The TOSA may also include an isolator positioned between the filter assembly and the focusing lens to reduce or prevent back reflection from reaching any of the N lasers.

The use of a filter assembly in each of the example multi-laser TOSAs disclosed herein enables the combination of multiple optical signals with relatively no optical loss as compared to other methods of combining lasers in TOSAs. For example, in multi-laser TOSAs that combine signals with different polarizations there is a 3 dB loss because of the different polarizations that does not occur when using a filter assembly as disclosed herein.

The size and cost of the example multi-laser TOSAs disclosed herein are also relatively low compared to other know multi-laser TOSAs. One reason for the relatively low size and cost of the example TOSAs disclosed herein is that fewer and generally less expensive components are used in the example TOSAs disclosed herein. For example, many prior art TOSAs require mirrors or waveplates for polarizing the optical signals. The example embodiments disclosed herein do not require the use of any mirrors or waveplates. Furthermore, the costs for the filter assemblies in the TOSAs may be relatively low because multiple filter assemblies may be formed on a single large wafer. This may also contribute to better filter performance because individually produced filters may warp during the manufacturing process because of their small size.

The use of the filter assemblies in each of the example multi-laser TOSAs disclosed herein thus enables the example multi-laser TOSAs disclosed herein to exhibit a relatively low size, costs, and optical loss. Consequently, optoelectronic modules into which the TOSAs are integrated also exhibit relatively improved performance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A multi-laser transmitter optical subassembly comprising:
   at least first and second lasers configured to generate first and second optical signals, respectively, the first and second optical signals having different wavelengths;
   a focusing lens; and
   a filter assembly configured to combine the first and second optical signals into a combined optical signal that is receivable by the focusing lens, the filter assembly comprising:
      a substrate with a first side, a second side, a third side, and a fourth side, wherein the second side is opposite the first side and the third side is opposite the fourth side, the substrate positioned such that the combined optical signal exits the filter assembly through the fourth side of the substrate substantially parallel to the first optical signal when the first optical signal enters the filter assembly through the third side of the substrate; and
      a filter positioned in contact with the first side of the substrate wherein the filter is configured to pass one of the first and second optical signals and is configured to reflect another of the first and second optical signals based on the wavelengths of the first and second optical signals and the second side of the substrate is configured to reflect the first optical signal before the first optical signal reaches the filter when the first optical signal originates from the first laser.

2. The subassembly of claim 1, wherein the filter is a low pass filter with a cutoff wavelength between the wavelengths of the first and second optical signals.

3. The subassembly of claim 1, wherein the filter is a high pass filter with a cutoff wavelength between the wavelengths of the first and second optical signals.

4. The subassembly of claim 1, wherein the first and second optical signals have the same polarization.

5. The subassembly of claim 1, wherein the first and second optical signals both strike the filter at an angle of incidence that approximates 45 degrees.

6. The subassembly of claim 1, wherein the one of the first and second optical signals that is reflected by the second side of the substrate strikes the substrate at an angle of incidence that approximates 45 degrees.

7. The subassembly of claim 1, wherein the filter comprises a plurality of materials with at least two of the plurality of materials having different indexes of refraction.

8. The subassembly of claim 1, further comprising:
   an isolator between the filter assembly and the focusing lens, the isolator positioned so that the combined optical signal passes through the isolator; and first and second collimating lenses between the first and second lasers and the filter assembly, the first and second collimating lenses positioned so that the first and second optical signals pass through the first and second collimating lenses, respectively.

9. An optoelectronic transceiver module comprising:
a printed circuit board; and
the multi-laser transmitter optical subassembly as recited in claim 1 in electrical communication with the printed circuit board.

10. The subassembly of claim 1, wherein the filter is configured to combine the first and second optical signals by being configured to pass the one of the first and second optical signals and by being configured to reflect the another of the first and second optical signals.

11. The subassembly of claim 1, wherein the filter is configured to direct the combined optical signal toward the focusing lens.

12. A multi-laser transmitter optical subassembly comprising:
at least first, second, and third lasers configured to generate first, second, and third optical signals, respectively, the first, second, and third optical signals having different wavelengths;
a focusing lens; and
a filter assembly configured to combine the first, second, and third optical signals into a combined optical signal that is received by the focusing lens, the filter assembly comprising:
at least first and second filters, wherein each of the first and second filters is configured to pass at least one of the first, second, and third optical signals and to reflect at least one of the first, second, and third optical signals based on the wavelengths of the first, second, and third optical signals;
a first substrate with a first side, a second side, a third side, and a fourth side, wherein the second side is opposite the first side and the third side is opposite the fourth side, the first substrate positioned such that the combined optical signal exits the filter assembly substantially parallel to the first optical signal when the first optical signal enters the filter assembly through the third side of the first substrate, and wherein the first side of the first substrate is configured to reflect the first optical signal before the first optical signal reaches either the first or the second filter when the first optical signal originates from the first laser; and
a second substrate over the first substrate opposite the first side of the first substrate, the first filter located between the first and second substrates and the second filter located over the second substrate.

13. The subassembly of claim 12, wherein the first filter is configured to combine the first and second optical signals by passing the first optical signal and reflecting the second optical signal.

14. The subassembly of claim 13, wherein the second filter is configured to combine the combined first and second optical signals with the third optical signal by passing the third optical signal and reflecting the first and second optical signals.

15. The subassembly of claim 14, wherein the second filter is configured to direct the combined optical signal toward the focusing lens.

16. The subassembly of claim 13, wherein the second filter is configured to combine the combined first and second optical signals with the third optical signal by passing the combined first and second optical signals and reflecting the third optical signal.

17. The subassembly of claim 12, wherein the first and second filters are both low pass filters with different cutoff wavelengths.

18. The subassembly of claim 12, wherein the first and second filters are both high pass filters with different cutoff wavelengths.

19. The subassembly of claim 12, wherein one of the first and second filters is a low pass filter and another of the first and second filters is a high pass filter, wherein the first and second filters have different cutoff wavelengths.

20. The subassembly of claim 12,
wherein each of the first and second filters comprises a plurality of materials with at least two of the plurality of materials of each of the first and second filters having different indexes of refraction.

21. The subassembly of claim 20, wherein the filter assembly further comprises a third substrate over the second filter, the second filter located between the second and third substrates.

22. An optoelectronic transceiver module comprising:
a printed circuit board; and
the multi-laser transmitter optical subassembly as recited in claim 12 in electrical communication with the printed circuit board.

23. A multi-laser transmitter optical subassembly comprising:
N lasers, where N is an integer equal to or greater than two, where each of the N lasers is configured to generate one of N optical signals each having a different wavelength;
a focusing lens; and
a filter assembly configured to combine the N optical signals into a combined optical signal that is receivable by the focusing lens, the filter assembly comprising:
at least one substrate with a first side, a second side, a third side, and a fourth side, wherein the second side is opposite the first side and the third side is opposite the fourth side, the substrate positioned such that the combined optical signal exits the filter assembly substantially parallel to the first optical signal when the first optical signal enters the filter assembly through the third side of the substrate; and
only N−1 filters, wherein one of the N−1 filters is positioned over the first side of the substrate, each one of the N−1 filters is configured to pass at least one of the N optical signals and to reflect at least one of the N optical signals, and the second side of the substrate is configured to reflect at least one of the N optical signals before the at least one of the N optical signals reaches the N−1 filters when the at least one of the N optical signals originates from one of the N lasers.

24. The subassembly of claim 23, wherein the filter assembly further comprises N substrates, the N substrates including the at least one substrate, wherein each of the N substrates is separated from another of the N substrates by one of the N−1 filters.

25. The subassembly of claim 23, wherein each of the N−1 filters comprises a plurality of materials with at least two of the plurality of materials of each of the N−1 filters having different indexes of refraction.

26. The subassembly of claim 23, wherein each of the N−1 filters is a low pass filter and each of the N−1 filters has a different cutoff wavelength.

27. The subassembly of claim 23, wherein each of the N−1 filters is a high pass filter and each of the N−1 filters has a different cutoff wavelength.

28. The subassembly of claim 23, wherein at least one of the N−1 filters is a high pass filter and at least one of the N−1 filters is a low pass filter, wherein each of the N−1 filters has a different cutoff wavelength.

29. An optoelectronic transceiver module comprising:
   a printed circuit board; and
   the multi-laser transmitter optical subassembly as recited in claim 23 in electrical communication with the printed circuit board.

* * * * *

UNITED STATES PATENT AND TRADEMARK OFFICE
CERTIFICATE OF CORRECTION

PATENT NO. : 8,995,845 B2  Page 1 of 1
APPLICATION NO. : 13/346254
DATED : March 31, 2015
INVENTOR(S) : Du et al.

It is certified that error appears in the above-identified patent and that said Letters Patent is hereby corrected as shown below:

In The Claims

In Column 5, Line 27, delete "222, 226." and insert -- 212, 216. --, therefor.

In Column 7, Line 11, delete "440 has" and insert -- 432 has --, therefor.

Signed and Sealed this
First Day of March, 2016

Michelle K. Lee
*Director of the United States Patent and Trademark Office*